G. CORNWALL.
GRIDIRONS.
No. 181,823. Patented Sept. 5, 1876.
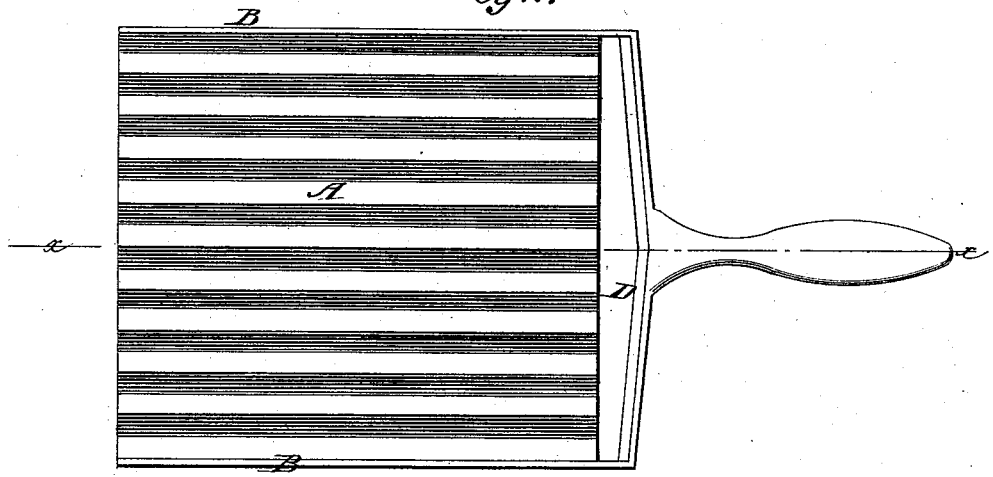
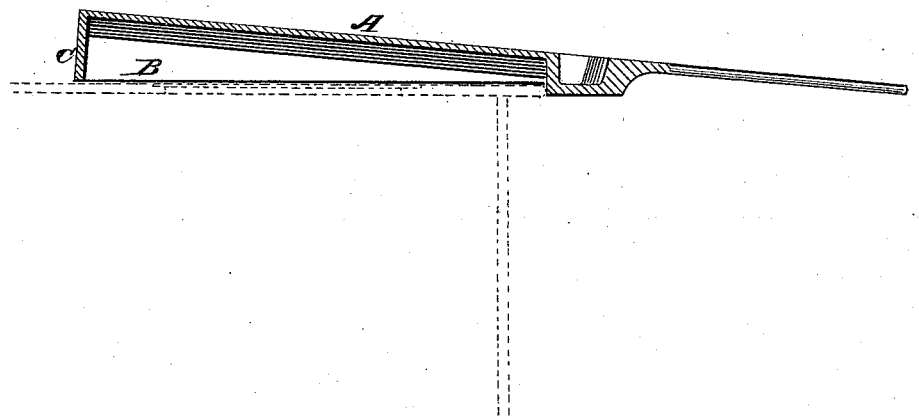
WITNESSES:
Francis McArdle,
John Goethals
INVENTOR:
Geo. Cornwall
BY
ATTORNEYS.

UNITED STATES PATENT OFFICE.

GEORGE CORNWALL, OF GARDEN CITY, NEW YORK.

IMPROVEMENT IN GRIDIRONS.

Specification forming part of Letters Patent No. 181,823, dated September 5, 1876; application filed February 28, 1876.

*To all whom it may concern:*

Be it known that I, GEORGE CORNWALL, of Garden City, in the county of Queens and State of New York, have invented a new and Improved Gridiron, of which the following is a specification:

My invention consists of a close corrugated plate for supporting the meat on the upper angles of the corrugations, to which plate I have applied flanges extending down from the sides and back to rest on the stove-top, and inclose the space under the plate while it rests on the stove-top at the front, and has a trough, for receiving the gravy, projecting beyond and below the stove-top.

The essential feature of the invention is the flanges at the back and sides of the plate to inclose the space underneath it for preventing the escape of smoke from the stove, and also preventing the stoppage of the draft of the stove by taking off the cover to expose the gridiron to the heat.

Figure 1 is a plan view of my improved gridiron. Fig. 2 is a section on line $x\ x$.

Similar letters of reference indicate corresponding parts.

A is the corrugated plate on which the meat is placed for broiling, the same being made with sharp angles at the top, so as to present as little surface to the meat as possible. B represents the flanges at the sides, and C the one at the back for inclosing the space under the plate, and D represents the trough at the front edge. The side flanges are so inclined that the plate rests on the stove at the front and the trough overhangs the front plate, and is a little lower than the bottom of the grooves of the plate, so that the gravy will run into it.

The close plate protects the meat from the flame and smoke, and cooks the meat better by checking the intensity of the heat to some extent, and, by inclosing the space below, keeps the draft of the stove good.

Having thus described my invention, I claim as new and desire to secure by Letters Patent—

The improved gridiron, consisting of the corrugated close plate A, having inclined side flanges B, rear flange C, and the projecting and depressed front trough D, substantially as specified.

GEO. CORNWALL.

Witnesses:
T. B. MOSHER,
ALEX. F. ROBERTS.